United States Patent
Chen et al.

(10) Patent No.: US 11,339,742 B2
(45) Date of Patent: May 24, 2022

(54) INTERNAL COMBUSTION ENGINE HAVING CYLINDER BLOCK WITH CAST-IN OIL PUMP INLET AND OUTLET PASSAGES

(71) Applicant: Caterpillar Inc., Peoria, IL (US)

(72) Inventors: Allen Yao Chen, Dunlap, IL (US); Thomas Lee Atwell, Maryville, TN (US); Jason Lee Van Farowe, Brimfield, IL (US); Daniel Halvorson, Peoria, IL (US); Neil Edward Johnston, East Peoria, IL (US); Aaron G. Heintz, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/067,014

(22) Filed: Oct. 9, 2020

(65) Prior Publication Data

US 2022/0112862 A1    Apr. 14, 2022

(51) Int. Cl.
    *F02F 7/00*     (2006.01)
    *F01M 1/02*     (2006.01)
    *F02F 11/00*     (2006.01)
    *F16H 1/20*     (2006.01)

(52) U.S. Cl.
    CPC ............ *F02F 7/0021* (2013.01); *F01M 1/02* (2013.01); *F02F 7/0002* (2013.01); *F02F 11/00* (2013.01); *F01M 2001/0292* (2013.01); *F02F 2200/06* (2013.01); *F16H 1/20* (2013.01)

(58) Field of Classification Search
CPC ........ F02F 7/0021; F02F 7/0002; F02F 11/00; F02F 2200/06; F02F 7/0039; F01M 1/02; F01M 2001/0292; F16H 1/20
See application file for complete search history.

(56) References Cited

U.S. PATENT DOCUMENTS

| | | | |
|---|---|---|---|
| 5,016,584 A * | 5/1991 | Inoue | .............. F01M 11/02 |
| | | | 123/195 R |
| 5,069,192 A | 12/1991 | Matsumoto | |
| 5,778,848 A * | 7/1998 | Takahashi | ............ F01M 1/02 |
| | | | 123/196 AB |
| 7,040,275 B2 | 5/2006 | Ohta et al. | |
| 8,677,973 B2 | 3/2014 | Petry-Johnson et al. | |
| 9,181,909 B2 | 11/2015 | Unes et al. | |
| 9,810,115 B2 | 11/2017 | Quinton et al. | |
| 10,247,135 B2 * | 4/2019 | Kojima | ............... F16C 9/02 |

FOREIGN PATENT DOCUMENTS

| | | |
|---|---|---|
| CN | 102758688 B | 12/2014 |
| JP | 2006250104 A | 9/2006 |
| JP | 4248462 B2 | 1/2009 |

* cited by examiner

*Primary Examiner* — Syed O Hasan
(74) *Attorney, Agent, or Firm* — Brannon Sowers & Cracraft

(57) ABSTRACT

An internal combustion engine includes a one-piece cylinder block casting, a flywheel supported for rotation at a front block end, and a back gear train supported for rotation at a back block end. Cast-in pump inlet and outlet passages are formed in the cylinder block casting and open in a pump mounting face at the back block end. An oil pump is clamped to the pump mounting face and includes a pump inlet and a pump outlet fluidly connected, respectively, to the cast-in pump inlet passage and the cast-in pump outlet passage.

20 Claims, 4 Drawing Sheets

INTERNAL COMBUSTION ENGINE HAVING CYLINDER BLOCK WITH CAST-IN OIL PUMP INLET AND OUTLET PASSAGES

TECHNICAL FIELD

The present disclosure relates generally to an internal combustion engine, and more particularly to a cylinder block casting having cast-in oil pump inlet and outlet passages extending to a back end pump mounting face.

BACKGROUND

Modern internal combustion engines typically include a variety of different features integrated to the design of an engine housing for conveying fluids between and amongst various engine subsystems. For example, coolant channels are commonly formed through a combination of cast-in and drilled conduits to permit engine coolant to be circulated around combustion cylinders in the cylinder block to dissipate heat of combustion to the engine coolant. Various additional channels and passageways are commonly formed to enable conveying engine oil for lubrication and cooling purposes into direct contact with moving parts of the engine. Still other integral passages can be provided such as in an engine head to deliver fuel for combustion. Cylinder blocks are commonly cast from iron, steel, aluminum, or other materials. The casting apparatuses and processes for producing cylinder blocks can be quite complex. Once a cylinder block casting is formed, a variety of post-casting machining processes are typically employed to render a completed product that can be assembled with other components, including externally mounted pumps for conveying the various fluids to and from target locations in the engine.

An oil pan is commonly coupled to an underside of a cylinder block to contain a volume of engine oil to be circulated to and among components of the internal combustion engine. In some known designs an oil pump is resident in the oil pan of the engine. Other strategies mount an oil pump in or adjacent to an engine gear train, or to an underside of the cylinder block. Known systems can suffer from inefficiencies or requirements for an excessive number of components to route engine oil to and from the oil pump. Other difficulties and challenges associated with engine oil system design arises from differences in entry and exit planes in an oil pump, which can make it difficult to assemble the oil pump to the engine in light of geometric tolerances. One known example of an internal combustion engine having an engine block structured for attaching rotating components is set forth in U.S. Pat. No. 8,677,973 to Petry-Johnson et al. Petry-Johnson et al proposed an internal combustion engine having a front housing attached to a first end of an engine block, and an idler gear assembly rotatably mounted on a stub shaft and having a first attachment to the engine block and a second attachment to the front housing. A thrust plate is positioned between the front housing and the idler gear assembly.

SUMMARY OF THE INVENTION

In one aspect, an internal combustion engine includes a cylinder block casting having a plurality of cylinders formed therein. The plurality of cylinders extend between a top deck surface and a bottom block surface, and are arranged between a front block end, and a back block end having a pump mounting face. The internal combustion engine further includes a flywheel supported for rotation at the front block end, and a back geartrain supported for rotation at the back block end and including a pump gear. The internal combustion engine further includes a cast-in pump inlet passage formed in the cylinder block casting and opening in the pump mounting face, and a cast-in pump outlet passage formed in the cylinder block casting and opening in the pump mounting face. The internal combustion engine still further includes an oil pump clamped to the pump mounting face and including a pump inlet and a pump outlet fluidly connected, respectively, to the cast-in pump inlet passage and the cast-in pump outlet passage.

In another aspect, a cylinder block for an internal combustion engine includes a one-piece cylinder block casting having a plurality of cylinders formed therein. The plurality of cylinders extend between a top deck surface and a bottom block surface, and are arranged between a front block end, and a back block end having a pump mounting face. A cast-in pump inlet passage is formed in the one-piece cylinder block casting and extends forwardly and downwardly from the pump mounting face to the bottom block surface, and a cast-in pump outlet passage is formed in the one-piece cylinder block casting and extends forwardly from the pump mounting face.

In still another aspect, a cylinder block for an internal combustion engine includes a one-piece cylinder block casting having a top deck surface, a bottom block surface, a front block end, and a back block end. The one-piece cylinder block casting further includes a plurality of cylinders formed therein and each extending between the top deck surface and the bottom block surface. The one-piece cylinder block casting further includes a pump mounting face formed on the back block end, and each of an oil inlet opening and an oil outlet opening formed in the pump mounting face. The one-piece cylinder block casting further includes an oil module side face located between the front block end and the back block end. A cast-in pump inlet passage extends through the one-piece cylinder block casting from the oil inlet opening to the bottom block surface, and a cast—in pump outlet passage extends through the one-piece cylinder block casting from the oil outlet opening to the oil module side face.

DETAILED DESCRIPTION

Figure 1:
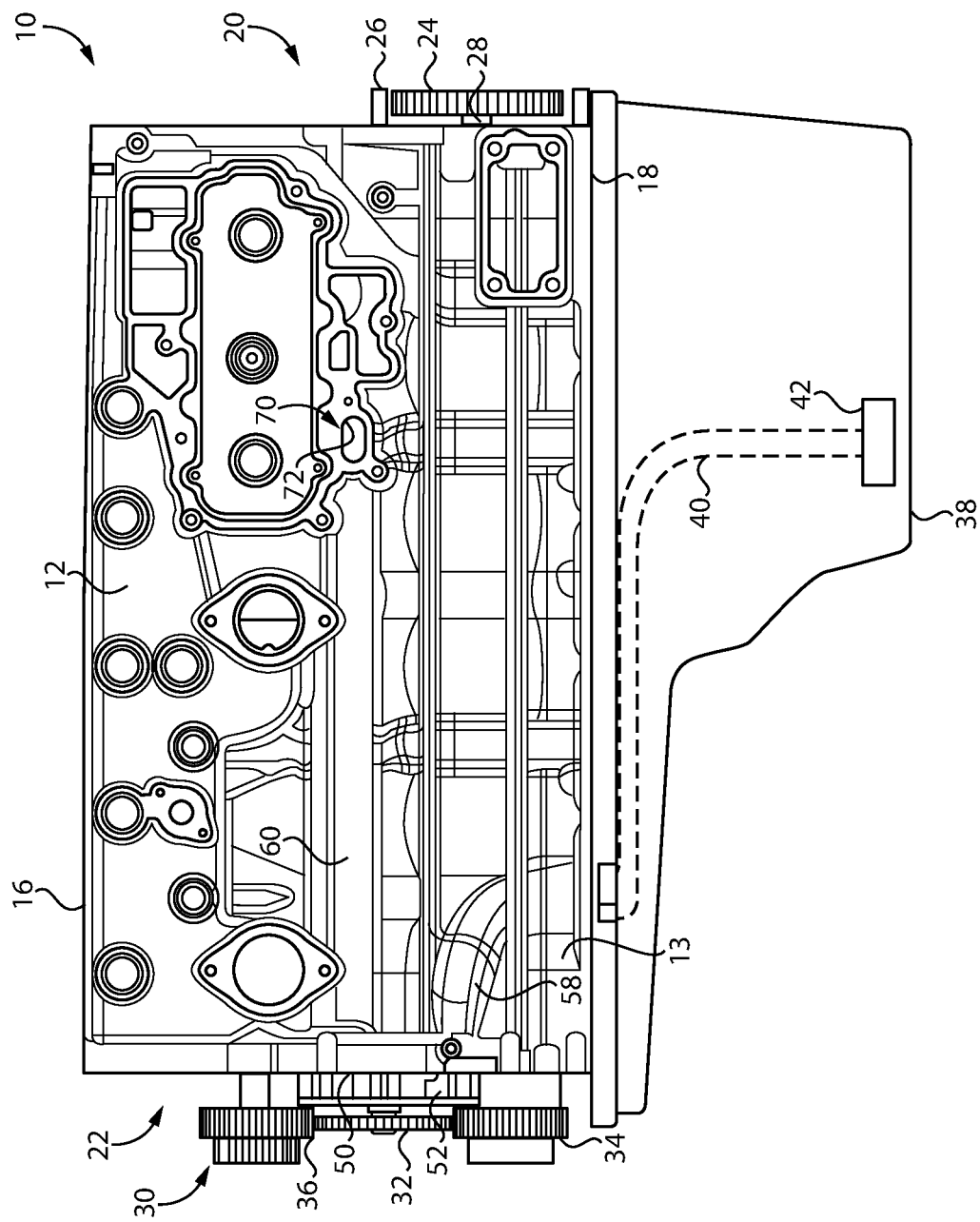
FIG. 1 is a side diagrammatic view of an internal combustion engine, according to one embodiment.
Figure 2:
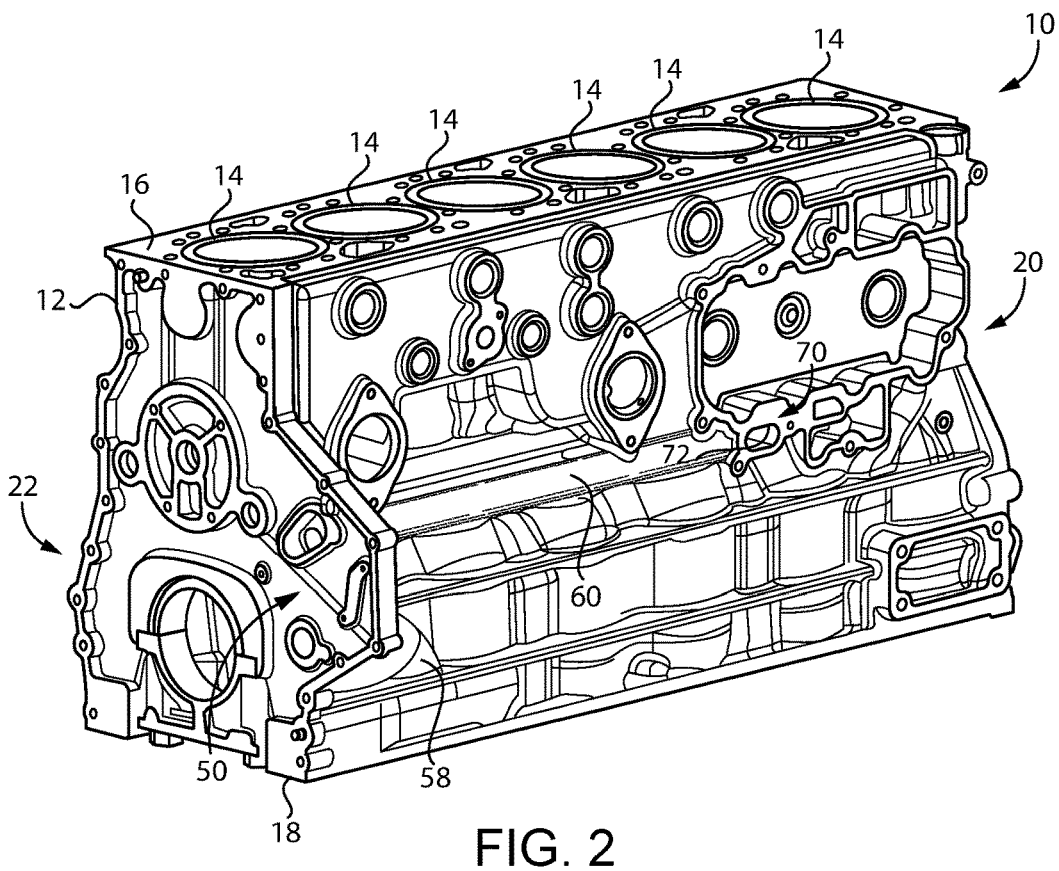
FIG. 2 is a perspective view of a cylinder block casting, according to one embodiment.
Figure 3:
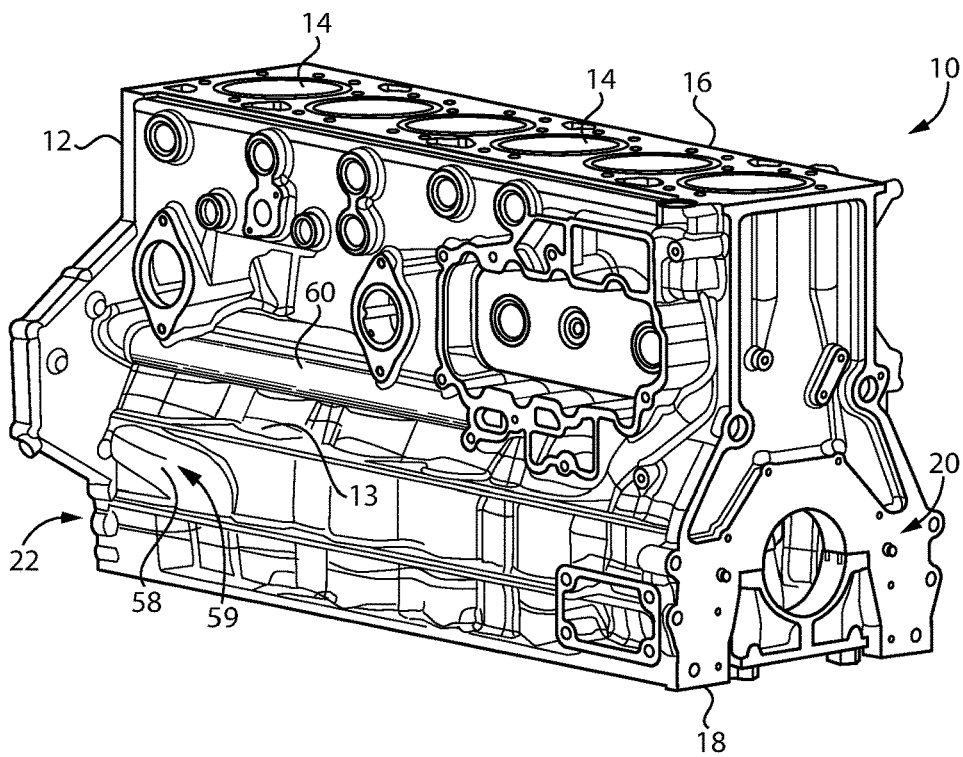
FIG. 3 is another perspective view of the cylinder block casting shown in FIG. 2.

Referring to FIGS. 1-4, there are show several views of an internal combustion engine 10, and a one-piece cylinder block casting 12 suitable for use in internal combustion engine 10. Cylinder block casting 12 has a plurality of combustion cylinders 14 formed therein. Cylinders 14 are shown in an in-line configuration, but could be arranged in a V-pattern or any other suitable arrangement in other embodiments. Cylinders 14 extend between a top deck surface 16 and a bottom block surface 18, and are arranged between a front block end 20 and a back block end 22, in an example in-line arrangement as noted above. Internal combustion engine 10 can include a compression-ignition diesel engine structured to operate on a liquid fuel such as a diesel distillate fuel, however, the present disclosure is not thereby limited and internal combustion engine 10 could be spark-ignited, operated on another liquid fuel such as gasoline, a gaseous fuel such as natural gas, or could even be a dual fuel engine operating on either or both of a liquid fuel and a gaseous fuel. Internal combustion engine 10 could be directly injected by way of a plurality of fuel injectors (not shown) structured to directly inject liquid fuel into cylinders 14. Internal combustion engine 10 further includes a crankshaft 28 structured to rotate based upon reciprocation of pistons (not shown) in cylinders 14 in a generally conventional manner. A flywheel 24 is supported for rotation at front block end 20 and coupled with crankshaft 28, again in a generally conventional manner. Flywheel 24 may be at least partially within a flywheel housing 26 mounted to cylinder block casting 12 in some embodiments.

Internal combustion engine 10 further includes a back gear train 30 supported for rotation at back block end 22 in response to rotation of crankshaft 28, and including a main drive gear 34, a pump gear 32 that can be directly or indirectly driven by way of main drive gear 34, and at least one additional gear 36. Gear 36 can be rotated directly or indirectly by way of main drive gear 34, and operable to drive a water pump, an air conditioning compressor, or any of a variety of other equipment. Back block end 22 includes a pump mounting face 50, which can include a compound pump mounting face as further discussed herein. Internal combustion engine 10 further includes an oil pump 52 clamped to pump mounting face 50. As will be further apparent from the following description internal combustion engine 10, and cylinder block casting 12 in particular, is uniquely configured by way of integral cast—in features for supplying engine oil to and from oil pump 52 in a manner that provides for efficient and compact mounting and elimination of external oil lines relative to certain known engine systems.

Figure 4:
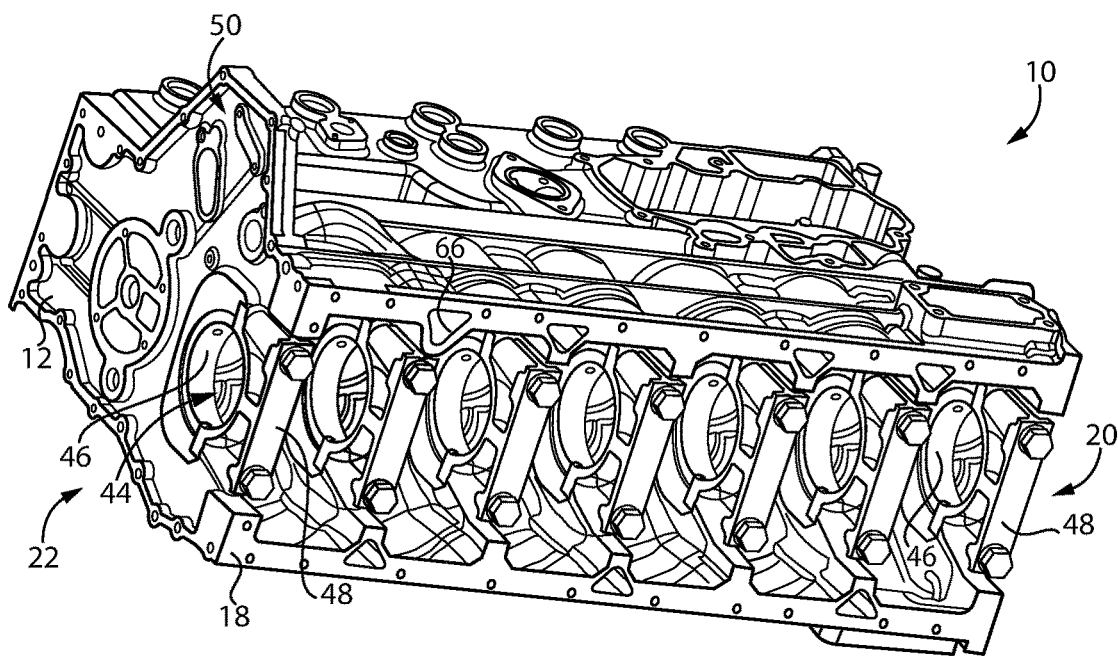
FIG. 4 is a bottom perspective view of a cylinder block casting as in FIGS. 2 and 3.

Internal combustion engine 10 further includes an oil pan 38 mounted to bottom block surface 18, typically with an interposed gasket or the like. An oil line 40 is within oil pan 38, and may extend from an inlet filter end 42 submerged in oil contained in oil pan 38 to cylinder block casting 12 to supply engine oil to oil pump 52. Oil pump 52 can include a rotary vane pump or the like in some embodiments, however, the present disclosure is not thereby limited. As depicted in FIG. 4, cylinder block casting 12 forms a crankcase 44 and includes bearings or journals 46 and bearing caps 48 structured to support crankshaft 28 for rotation, again in a generally conventional manner.

Figure 7:
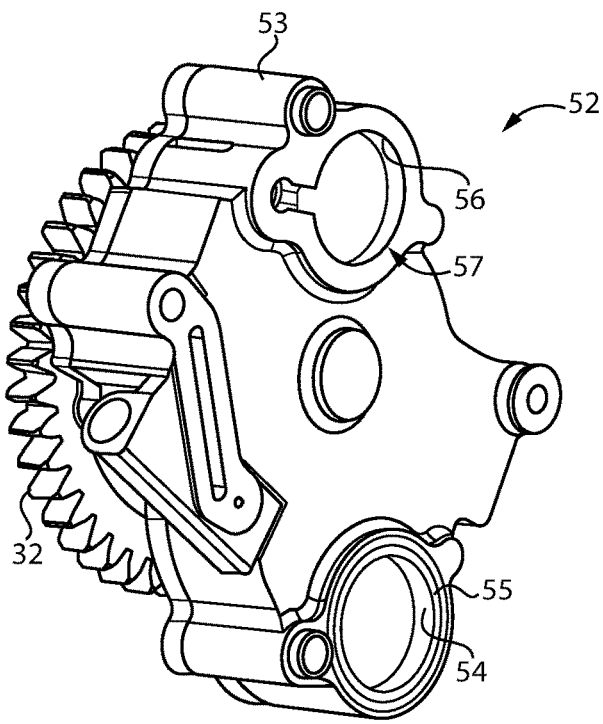
FIG. 7 is a diagrammatic view of an oil pump suitable for use in the internal combustion engine of FIG. 1.

Internal combustion engine 10 also includes a cast-in pump inlet passage 58 formed in cylinder block casting 12 and opening in pump mounting face 50, and a cast-in pump outlet passage 60 formed in cylinder block casting 12 and also opening in pump mounting face 50. Referring briefly to FIG. 7, oil pump 52 includes a pump housing 53, and a pump inlet 58 and a pump outlet 56 fluidly connected, respectively, to cast-in pump inlet passage 58 and cast-in pump outlet passage 60.

As shown in FIG. 4, pump inlet passage 58 opens in bottom block surface 18 and extends forwardly and downwardly through cylinder block casting 12 from pump mounting face 50 to bottom block surface 18. It can also be seen that pump inlet passage 58 forms at least one turn 59 between pump mounting face 50 and bottom block surface 18, generally traversing an at least partially curvilinear path between pump mounting face 50 and bottom block surface 18 such that pump inlet passage 58 can fluidly connect to oil line 40 in oil pan 38. It can also be noted that cylinder block casting 12 includes an oil module side face 70 located between front block end 20 and back block end 22. Pump outlet passage 60 extends forwardly through cylinder block casting 12 from pump mounting face 50 to oil module side face 70. An outlet opening 72 is formed in oil module side face 70, and is structured to feed pumped oil received by way of pump outlet passage 60 into a side-mounted fluids module or oil module upon cylinder block casting 12. An oil module or other fluids module can include components such as filters, coolers, sensors, and/or other equipment for treating, monitoring, or manipulating the properties of engine oil or other fluids and returning the same into cylinder block casting 12.

Figure 5:
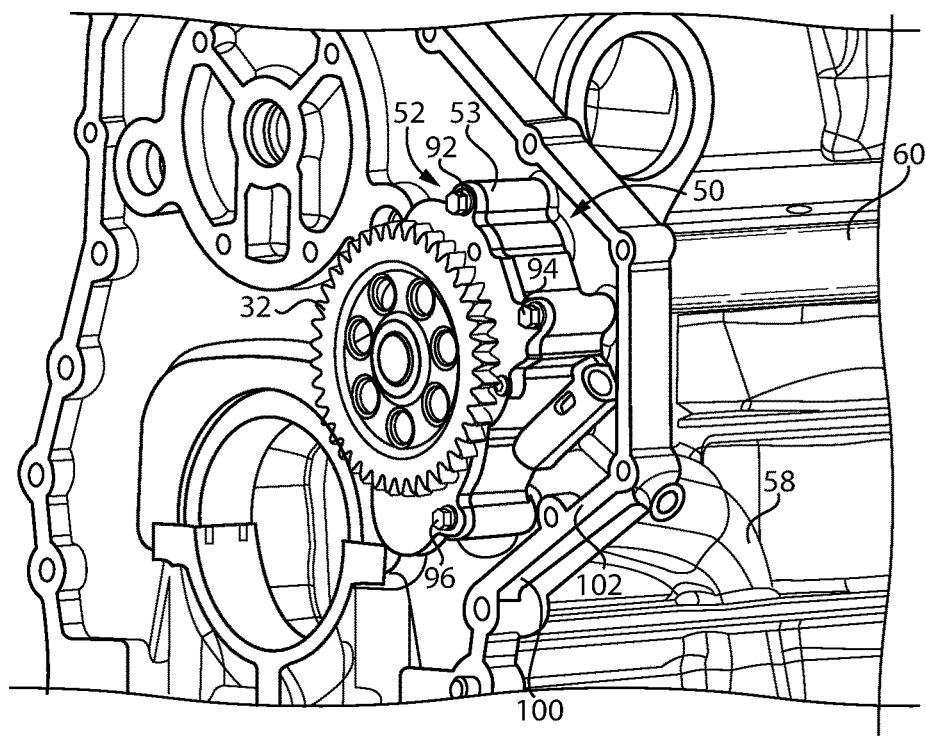
FIG. 5 is a diagrammatic view of a portion of a cylinder block casting as in FIGS. 2-4 and an installed oil pump.
Figure 6:
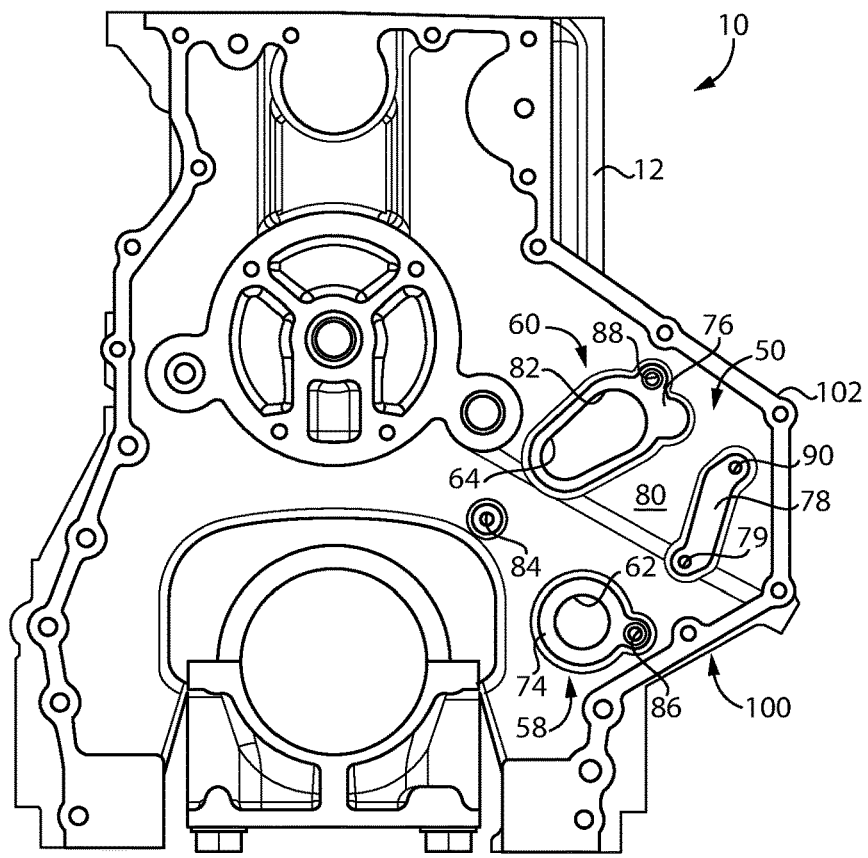
FIG. 6 is an end view of a cylinder block casting as in FIGS. 2-4.

It will be recalled that pump mounting face 50 may include a compound pump mounting face. Referring also now to FIGS. 5 and 6, pump mounting face 50 may be formed by a machined inlet surface 74, a machined outlet surface 76, and a machined clamping surface 78. Internal combustion engine 10 may further include a plurality of bolts 92, 94, 96, and typically at least one additional bolt not visible in the figures, that together clamp oil pump 52 to pump mounting face 50. An as-cast surface 80 extends among machined inlet surface 74, machined outlet surface 76, and machined clamping surface 78. In the illustrated embodiment, an oil inlet opening 62, fluidly connected to inlet passage 58, is formed in pump mounting face 50, in particular formed in machined inlet surface 74. An oil outlet opening 64 is formed in pump mounting face 50, and in particular in machined outlet surface 76. An oil transfer channel 82 may also be formed in machined outlet surface 76 and fluidly connects outlet passage 60 to pump outlet 56. Providing oil transfer channel 82 can enable pump outlet 56 to be offset from opening 64 in at least some embodiments, providing advantages respecting packaging and back gear train configuration. A first bolt hole 84 may receive a first one of the several bolts clamping oil pump 52 to cylinder block casting 12. A second bolt hole 86 may receive a second bolt, a third bolt hole 90 may receive yet another bolt, and a fourth bolt hole 88 may receive yet another bolt. Bolt holes 84, 86, 88, and 90, as well as the respective bolts may have a non-regular arrangement in cylinder block casting 12, meaning that the respective bolt holes and bolts are not positioned at corners of a regular polygon and may not be positioned upon a common circle. As can also be seen from FIG. 6 an opening 79 to a cross-drilled oil passage for hydraulic feedback may be formed in clamping surface 78, and can communicate a pressure of oil to oil pump 52 for feedback purposes that will be apparent to those skilled in the art. FIG. 6 also illustrates a projecting side wing 100 of cylinder block casting 12 located at back block end 22. Pump mounting face 50 may be formed at least in part upon projecting side wing 100. A back end flange 102 of cylinder block casting 12 is located upon projecting side wing 100 peripherally outward of pump mounting face 50 and projects in a rearward direction, in and out of the page in the FIG. 6 illustration. Additional components in the nature of one or more housings can be mounted to back end flange 102 to house back gear train 30 in some embodiments.

Oil pump 52 may, together with cylinder block casting 12, provide for single-plane, single-interface mounting of oil pump 52. In other words, pump mounting face 50 and the counterpart surfaces of pump housing 53 abut one another all in a common plane when oil pump 52 is installed for service on cylinder block casting 12. Pump housing 53 and pump mounting face 50 may together form a metal-to-metal outlet seal 57. Metal-to-metal outlet seal 57 may be formed in part by an outlet protrusion 61, of pump housing 53. Internal combustion engine 10 may further include a non-metallic inlet seal 55, such as a rubber or rubber-like O-ring seal, that is clamped between pump housing 53 and pump mounting face 50. Accordingly, only a single mating connection formed by contact of surfaces is required for pump installation, simultaneously establishing fluid connections between pump 52 and inlet passage 58, between pump 52 and outlet passage 60, and also between pump 52 and opening 79.

INDUSTRIAL APPLICABILITY

Referring to the drawings generally, during operation of internal combustion engine 10 pistons will reciprocate to compress and ignite a mixture of fuel and air in cylinders 14, causing crankshaft 28 to rotate and in turn rotate pump gear 32 in back gear train 30. Rotation of pump gear 32 will operate oil pump 50 to suck engine oil through oil line 40, through pump inlet passage 58, and convey the engine oil through pump outlet passage 60 to a fluids module mounted to cylinder block casting 12. It can be noted from the drawings that cylinder block casting 12 includes an outer surface 13. Pump inlet passage 58 and pump outlet passage 60 may be formed by a curvilinear inlet conduit and a linear outlet conduit also identified with reference numerals 58 and 60, respectively, exposed externally to form a portion of outer surface 13 upon cylinder block casting 12.

It will also be recalled that pump inlet passage 58 may form at least one turn 59 and takes a curvilinear path between inlet opening 66 and inlet opening 62. Pump outlet passage 60 may have a linear path extending between outlet opening 64 and outlet opening 72 in oil module side face 70. Providing pump inlet passage 58 and pump outlet passage 60 according to the described configurations provides passage shapes and travel distances that assist in minimizing an amount of oil pressure loss, resulting in improved flow performance. The provision of the cast-in passages reduces or eliminates any need for external piping and an associated reduction of complexity in manufacturing and assembly.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An internal combustion engine comprising:
   a cylinder block casting having a plurality of cylinders formed therein, the plurality of cylinders extending between a top deck surface and a bottom block surface, and arranged between a front block end, and a back block end having a pump mounting face;
   a flywheel supported for rotation at the front block end;
   a back gear train supported for rotation at the back block end and including a pump gear;
   a cast-in pump inlet passage formed in the cylinder block casting and opening in the pump mounting face;
   a cast-in pump outlet passage formed in the cylinder block casting and opening in the pump mounting face;
   an oil pump clamped to the pump mounting face and including a pump inlet and a pump outlet fluidly connected, respectively, to the cast-in pump inlet passage and the cast-in pump outlet passage; and
   the pump mounting face includes a compound pump mounting face having a machined inlet surface and a machined outlet surface, and the pump inlet passage and the pump outlet passage open, respectively, in the machined inlet surface and the machined outlet surface.

2. The internal combustion engine of claim 1 wherein the pump inlet passage opens in the bottom block surface and extends forwardly and downwardly through the cylinder block casting from the pump mounting face to the bottom block surface.

3. The internal combustion engine of claim 2 wherein the cylinder block casting includes an oil module side face, and the pump outlet passage opens in the oil module side face and extends forwardly through the cylinder block casting from the pump mounting face to the oil module side face.

4. The internal combustion engine of claim 1 wherein the oil pump and the pump mounting face together form a metal-to-metal outlet seal.

5. The internal combustion engine of claim 4 further comprising a non-metallic inlet seal clamped between the pump housing and the pump mounting face.

6. The internal combustion engine of claim 1 wherein the pump compound face further includes a machined clamping surface, and further comprising bolts arranged in a non-regular pattern and clamping the oil pump to each of the machined inlet surface, the machined outlet surface, and the machined clamping surface.

7. The internal combustion engine of claim 6 wherein the cylinder block casting includes an as-cast surface extending among the machined inlet surface, the machined outlet surface, and the machined clamping surface.

8. The internal combustion engine of claim 6 wherein an oil transfer channel is formed in the machined outlet surface and fluidly connects the cast-in outlet passage to the pump outlet.

9. The internal combustion engine of claim 6 wherein the cylinder block casting further includes:
   a projecting side wing located at the back block end, and the pump mounting surface is formed at least in part upon the projecting side wing; and
   a back end flange located upon the projecting side wing peripherally outward of the pump mounting face and projecting in a rearward direction.

10. A cylinder block for an internal combustion engine:
    a one-piece cylinder block casting having a plurality of cylinders formed therein, the plurality of cylinders extending between a top deck surface and a bottom block surface, and arranged between a front block end, and a back block end having a pump mounting face;
    a cast-in pump inlet passage formed in the one-piece cylinder block casting and extending forwardly and downwardly from the pump mounting face to the bottom block surface; and a cast-in pump outlet passage formed in the one-piece cylinder block casting and extending forwardly from the pump mounting face.

11. The cylinder block of claim 10 wherein the pump mounting face includes a compound pump mounting face having a machined inlet surface and a machined outlet surface, and the pump inlet passage and the pump outlet passage open, respectively, in the machined inlet surface and the machined outlet surface.

12. The cylinder block of claim 10 wherein the compound pump mounting face further includes a machined clamping surface, and an as-cast surface extends among the machined inlet surface, the machined outlet surface, and the machined clamping surface.

13. The cylinder block of claim 10 wherein the one-piece cylinder block casting further includes bolt holes formed in the machined inlet surface, the machined outlet surface, and the machined clamping surface.

14. The cylinder block of claim 10 wherein the pump inlet passage forms at least one turn between the pump mounting face and the bottom block surface.

15. The cylinder block of claim 10 wherein the one-piece cylinder block casting further includes an oil module side face located between the front block end and the back block end, and the pump outlet passage extends linearly from the pump mounting face to the oil module side face.

16. The cylinder block of claim 10 wherein the pump inlet passage and the pump outlet passage are formed, respectively, by an inlet conduit and an outlet conduit exposed externally upon the one-piece cylinder block casting.

17. The cylinder block of claim 10 wherein the one-piece cylinder block casting includes a projecting side wing located at the back block end, and the pump mounting surface is formed at least in part upon the projecting side wing.

18. A cylinder block for an internal combustion engine comprising:
a one-piece cylinder block casting having a top deck surface, a bottom block surface, a front block end, and a back block end;
the one-piece cylinder block casting further having a plurality of cylinders formed therein and each extending between the top deck surface and the bottom block surface;
the one-piece cylinder block casting further including a pump mounting face formed on the back block end, and each of an oil inlet opening and an oil outlet opening formed in the pump mounting face;
the one-piece cylinder block casting further including an oil module side face located between the front block end and the back block end;
a cast-in pump inlet passage extends through the one-piece cylinder block casting from the oil inlet opening to the bottom block surface; and
a cast-in pump outlet passage extends through the one-piece cylinder block casting from the oil outlet opening to the oil module side face.

19. The cylinder block of claim 18 wherein the pump inlet passage and the pump outlet passage are formed, respectively, by a curvilinear inlet conduit and a linear outlet conduit exposed externally upon the one-piece cylinder block casting.

20. The cylinder block of claim 18 wherein:
the pump mounting face includes a compound face formed by the machined inlet surface, the machined outlet surface, and a machined clamping surface;
the one-piece cylinder block casting further includes bolt holes formed in the machined inlet surface, the machined outlet surface, and the machined clamping surface; and
the one-piece cylinder block casting includes a projecting side wing located at the back block end, and the pump mounting face is formed at least in part upon the projecting side wing.

* * * * *